US011635733B2

(12) United States Patent
Kasinathan

(10) Patent No.: US 11,635,733 B2
(45) Date of Patent: Apr. 25, 2023

(54) SYSTEM OF CONTROLLERS AND SENSORS INTEGRATED WITH THE INTERNET OF THINGS FOR MAINTAINING ENVIRONMENTAL HEALTH AND SAFETY COMPLIANCE

(71) Applicant: Rengasamy Kasinathan, Peekskill, NY (US)

(72) Inventor: Rengasamy Kasinathan, Peekskill, NY (US)

(*) Notice: Subject to any disclaimer, the term of this patent is extended or adjusted under 35 U.S.C. 154(b) by 459 days.

(21) Appl. No.: 16/701,182

(22) Filed: Dec. 3, 2019

(65) Prior Publication Data
US 2021/0165373 A1 Jun. 3, 2021

(51) Int. Cl.
*H04L 67/12* (2022.01)
*H04L 43/06* (2022.01)
(Continued)

(52) U.S. Cl.
CPC .......... *G05B 13/026* (2013.01); *G06Q 10/20* (2013.01); *G06Q 30/018* (2013.01); *H04L 67/12* (2013.01);
(Continued)

(58) Field of Classification Search
None
See application file for complete search history.

(56) References Cited

U.S. PATENT DOCUMENTS

| 10,262,019 B1* | 4/2019 | Reiner | ................... H04L 67/10 |
| 2012/0323382 A1* | 12/2012 | Kamel | ................. G06Q 50/06 |
| | | | 700/286 |

(Continued)

OTHER PUBLICATIONS

Choubey et al., "Power Efficient, Bandwidth Optimized and Fault Tolerant Sensor Management for IOT in Smart Home", 2015, 2015 IEEE International Advance Computing Conference (IACC). (Year: 2015).*

(Continued)

*Primary Examiner* — Mohammad Ali
*Assistant Examiner* — Kelvin Booker
(74) *Attorney, Agent, or Firm* — John J. Matinez; Martinez Patents PC

(57) ABSTRACT

The present invention provides a system for compliance of an edifice with safety and environmental regulations. The system comprises at least one computer server integrated by mean of the Internet of things (IoT) with sensors and controllers, wherein the sensors and controllers are coupled to corresponding edifice's devices, structures and mechanisms. The sensors register environmental and safety measures in the edifice. The sensors also register the operational parameters of the devices, structures and mechanisms in the edifice. The computer server receives the registers from the sensors and based on these registers dictate, by means of actuating instructions to the controllers, the operation of the devices, structures and mechanisms of the edifice. The system also records logs of usage history and usage patterns for the devices, structures and mechanisms of the edifice. The computer server is programmed, based in the usage history and usage patterns, to predict potential failures of the devices, structures and mechanisms of the edifice. In case of potential failure of a device, structure, or mechanism, the computer server commands replacement or repair of the device, structure or mechanism. By anticipating the failure of devices, structures and mechanism in the edifice, the system of the present invention assures the flawless operation of the edifice and full compliance with safety and environmental regulations.

2 Claims, 3 Drawing Sheets

(51) Int. Cl.

| | | |
|---|---|---|
| *G06Q 50/16* | (2012.01) | |
| *G01C 21/20* | (2006.01) | |
| *G05B 13/02* | (2006.01) | |
| *G06Q 10/20* | (2023.01) | |
| *G06Q 30/018* | (2023.01) | |
| *G16Y 10/80* | (2020.01) | |

(52) U.S. Cl.
CPC ........... *G01C 21/20* (2013.01); *G06Q 50/163* (2013.01); *G16Y 10/80* (2020.01); *H04L 43/06* (2013.01)

(56) References Cited

U.S. PATENT DOCUMENTS

| | | | | |
|---|---|---|---|---|
| 2014/0214220 | A1* | 7/2014 | Kamel | G01R 21/133 |
| | | | | 702/62 |
| 2014/0303935 | A1* | 10/2014 | Kamel | G01D 21/00 |
| | | | | 702/189 |
| 2015/0285527 | A1* | 10/2015 | Kim | G06N 7/01 |
| | | | | 700/276 |
| 2016/0117785 | A1* | 4/2016 | Lerick | G06Q 10/20 |
| | | | | 705/305 |
| 2017/0019144 | A1* | 1/2017 | Malach | H04B 1/48 |
| 2018/0181094 | A1* | 6/2018 | Funk | H04L 67/12 |
| 2018/0232031 | A1* | 8/2018 | Swierk | H04L 43/08 |
| 2018/0234266 | A1* | 8/2018 | Rudolph | H04L 67/12 |
| 2018/0234318 | A1* | 8/2018 | Cox | H04Q 9/00 |
| 2018/0234489 | A1* | 8/2018 | Hammons | H04L 67/12 |
| 2018/0234519 | A1* | 8/2018 | Boyapalle | H04L 67/06 |
| 2018/0309818 | A1* | 10/2018 | Park | H04L 43/08 |
| 2019/0020530 | A1* | 1/2019 | Au | H04W 72/0413 |
| 2019/0041829 | A1* | 2/2019 | Sinha | G05B 19/4065 |
| 2019/0081503 | A1* | 3/2019 | Kim | H02J 9/005 |
| 2019/0171171 | A1* | 6/2019 | Verteletskyi | G06Q 90/205 |
| 2019/0172165 | A1* | 6/2019 | Verteletskyi | G06Q 10/06315 |
| 2019/0190737 | A1* | 6/2019 | Kim | H04L 12/2827 |
| 2019/0338976 | A1* | 11/2019 | Chakraborty | F24F 11/64 |
| 2021/0262689 | A1* | 8/2021 | Shinde | G05B 19/042 |

OTHER PUBLICATIONS

Prokhorov et al., "Intelligent Multi-Service Platform for Building Management", IEEE ATIT 2020. (Year: 2020).*

Yaïci et al., "Internet of Things for Power and Energy Systems Applications in Buildings: An Overview", 2020 IEEE. (Year: 2020).*

Sayed et al., "Chapter 2: Building Energy Management Systems (BEMS)", Energy Conservation in Residential, Commercial, and Industrial Facilities, First Edition, 2018, The Institute of Electrical and Electronics Engineers, Inc. (Year: 2018).*

* cited by examiner

SYSTEM OF CONTROLLERS AND SENSORS INTEGRATED WITH THE INTERNET OF THINGS FOR MAINTAINING ENVIRONMENTAL HEALTH AND SAFETY COMPLIANCE

BACKGROUND OF THE INVENTION

1. Field of the Invention

The present invention is related to a system for compliance of an edifice with environmental and safety regulations, wherein the system by means of a computer server receives input from sensors in the edifice, wherein the server based on the received input sends instructions to controllers of devices, structures and mechanisms in the edifice and wherein the server communicates with the sensors and controllers by means of the internet of things (IoT). The server is also programmed to make predictive estimates of potential failure of the devices, structures and mechanisms of the edifice, wherein the server, based on the predictive estimates, directs the replacement of the edifice's devices, structures and mechanisms.

2. Description of Prior Art

Hospitals and other edifices are subject to strict environmental and safety regulations that if not in compliance with, may cause human and adverse environmental mishaps, and also in penalties ranging from significant monetary fines to suspension of license to operate and closures.

The present invention provides a system that assures the continuous and permanent compliance of an edifice, e.g., a hospital, with environmental and safety regulations by integrating, by means of the Internet of things (IoT), sensors and controllers of devices, structures and mechanisms in the edifice with at least one computer server. While one time registers by the sensors of the safety and environmental variables in an edifice, and the actuation of controllers for the operation of devices, structures and mechanisms in the edifice by a computer server assist in the compliance of safety and environmental regulations, there is no description in the prior art of predictive failure of the edifice's devices, components and mechanisms.

The system of the present invention provides an integrated method to predictably prevent potential failure of the edifice's devices, structures and mechanisms, wherein at least one computer server, in response to the sensors input, generates instructions to actuate the controllers of the edifice's devices, structures and mechanisms, wherein the computer server's instructions are precisely executed by the faultless operation of the edifice's devices, structures and mechanisms.

SUMMARY OF THE INVENTION

The present invention provides a system for compliance of an edifice with environmental health and safety regulations. The system comprises at least one computer server integrated by mean of the Internet of things (IoT) with sensors and controllers, wherein the sensors and controllers are coupled to corresponding edifice's devices, structures and mechanisms. The sensors register environmental and safety measures in the edifice. The sensors also register the operational parameters of the devices, structures and mechanisms in the edifice. The computer server receives the registers from the sensors and based on these registers dictate, by means of actuating instructions to the controllers, the operation of the devices, structures and mechanisms of the edifice. The system also records logs of usage history and usage patterns for the devices, structures and mechanisms of the edifice. The computer server is programmed, based in the usage history and usage patterns, to predict potential failures of the devices, structures and mechanisms of the edifice. In case of potential failure of a device, structure, or mechanism, the computer server commands replacement or repair of the device, structure or mechanism. By anticipating the failure of devices, structures and mechanism in the edifice, the system of the present invention assures the flawless operation of the edifice and full compliance with safety and environmental regulations.

Specifically, the present invention provides a system for maintaining environmental health and safety compliance in an edifice, wherein the system comprises:
  a. at least one computer server;
  b. a plurality of sensors in the edifice, wherein the sensors register environmental and safety measures in the edifice, wherein the sensors register functioning parameters of devices, mechanisms and structures in the edifice, and wherein the sensors register usage pattern and usage history of devices, mechanisms and structures in the edifice, wherein the sensors transmit records of the registers to the computer server;
  c. a plurality of controllers in the edifice, wherein the controllers operate the functioning of devices, mechanisms and structures in the edifice, wherein the controllers receive from the computer server instructions to operate the functioning of devices, mechanisms and structures in the edifice;

wherein the computer server is programmed to generate instructions based on the received sensor records of the registers of environmental measures and functioning parameters of devices, mechanism and structures of the edifice, wherein the computer server sends the generated instructions to the controllers, wherein the computer server is programmed to use the register records of usage patterns and usage history to determine predictive estimates of potential failure of devices, mechanisms and structures in the edifice, wherein the computer server use the predictive estimates of potential failure to command replacement or repair of the devices, mechanisms and structures in the edifice.

In one aspect of the system of the present invention, the computer server is programmed to send instructions to the controllers, wherein the controllers actuate to operate the devices, structures and mechanisms of the edifice in compliance with environmental and safety regulations.

In another aspect of the method of the present invention, the computer server communicates with the sensors and controllers by means of the Internet of things.

In another aspect of the system of the present invention, the computer server communicates to human operators deviations from a predetermined baseline of sensor registers of environmental and safety measures in the edifice, and deviations from a predetermined baseline of sensor registers of functioning parameters of devices, mechanisms and structures in the edifice, wherein the predetermined baselines are in a range acceptable within environmental and safety regulations.

Objectives and advantages of the present Application invention will be more evident in the detailed description of the invention and the claims.

DETAILED DESCRIPTION OF THE INVENTION

Figure 1:
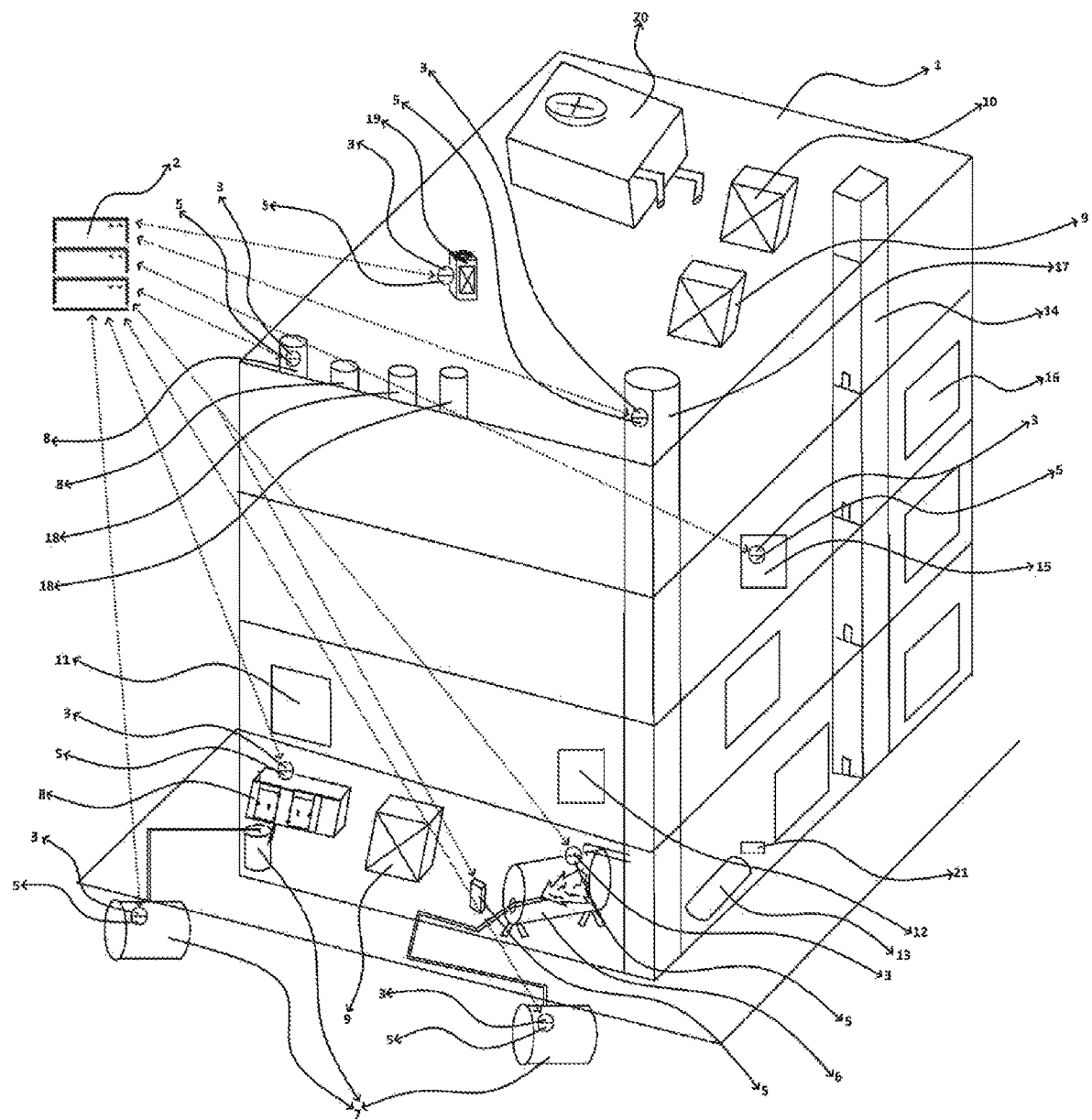
FIG. 1 shows an illustration of an embodiment of the system of the present invention wherein the communications by means of the internet of things (IoT), between at least one computer server (2) and the sensors (3) and the controllers (5) couple with the devices, structures and mechanisms in the edifice, is indicated by means of dotted lines with arrows at the dotted line ends.
Figure 2:
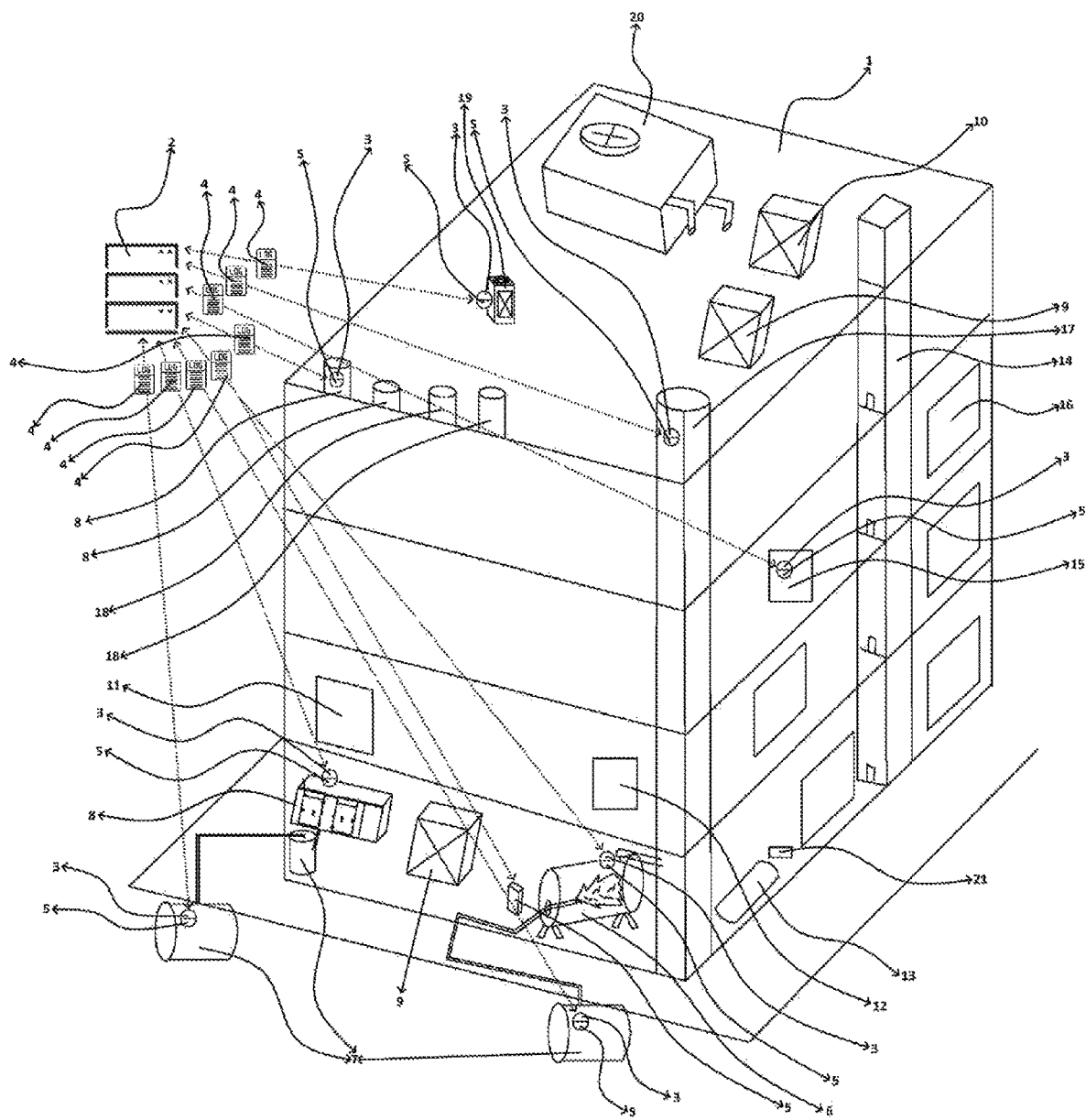
FIG. 2 shows an illustration of an embodiment of the system of the present invention wherein the communications by means of the internet of things (IoT), between at least one computer server (2) and the sensors (3) and the controllers (5) coupled with the devices, structures and mechanisms in the edifice, is indicated by means of dotted lines with arrows at the dotted line ends, and wherein as a result of these communications, there are usage history and usage patterns logs (4) for the devices, structures and mechanisms of the edifice.
Figure 3:
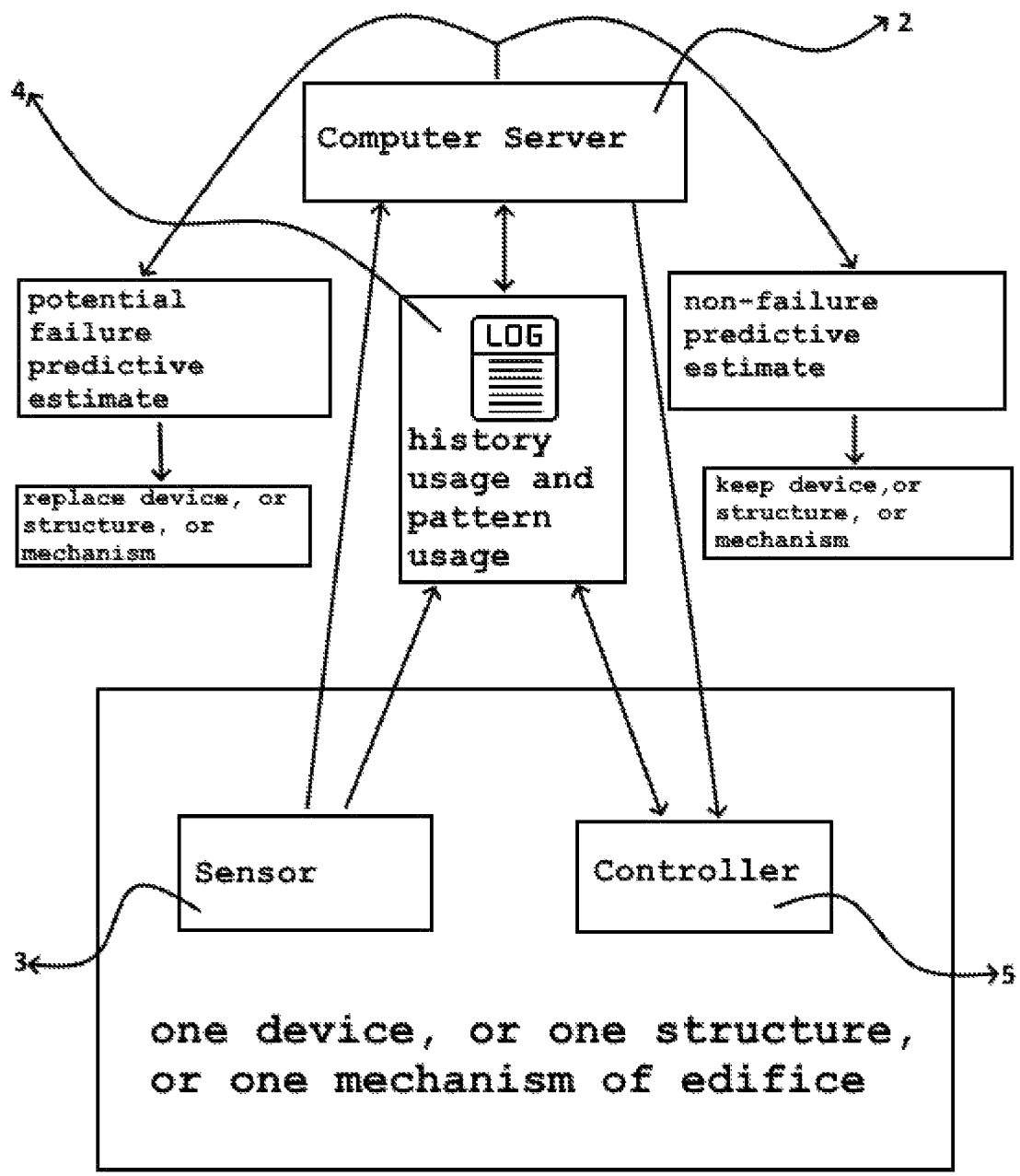
FIG. 3 shows an flow chart illustration of an embodiment of the system of the present invention wherein the flow of communication transactions between at least one computer server (2) with a sensor (3) and a controller (5) coupled to a device, structure or mechanism is indicated by means of solid lines with an arrow at the end, wherein as a result of these communication transactions there is a history and pattern usage log (4), wherein the computer server (2) is programmed to predict an estimate of either a potential failure or non-failure, and wherein as a consequence, the computer server (2) directs to keep or replace the device, structure or mechanism.

FIG. 1 and FIG. 2 show illustrations of an embodiment of the system of the present invention, wherein the system is for maintaining environmental health and safety compliance in an edifice (1), wherein the system comprises:
  a. at least one computer server (2);
  b. a plurality of sensors (3) in the edifice (1), wherein the sensors (3) register environmental and safety measures in the edifice (1), wherein the sensors register functioning parameters of devices, mechanisms and structures in the edifice (1), and wherein the sensors (3) register usage pattern and usage history (4) of devices, mechanisms and structures in the edifice (1), wherein the sensors (3) transmit records of the registers to the computer server (2);
  c. a plurality of controllers (5) in the edifice (1), wherein the controllers (5) operate the functioning of devices, mechanisms and structures in the edifice (1), wherein the controllers receive from the computer server (2) instructions to operate the functioning of devices, mechanisms and structures in the edifice (1);
wherein the computer server (2) is programmed to generate instructions based on the received sensor (3) records of the registers of environmental measures and functioning parameters of devices, mechanism and structures of the edifice (1), wherein the computer server (2) sends the generated instructions to the controllers (5), wherein the computer server (2) is programmed to use the register records of usage patterns and usage history (4) to determine predictive estimates of potential failure of devices, mechanisms and structures in the edifice, wherein the computer server (2) use the predictive estimates of potential failure to command replacement or repair of the devices, mechanisms and structures in the edifice (1).

In one aspect of the system of the present invention, the computer server (2) is programmed to send instructions to the controllers (5), wherein the controllers (5) actuate to operate the devices, structures and mechanisms of the edifice wherein the controllers actuate to operate the devices, structures and mechanisms of the edifice (1) in compliance with environmental and safety regulations.

In another aspect of the system of the present invention, the computer server (2) communicates with the sensors (3) and controllers (5) by means of the Internet of things (IoT).

In another aspect of the system of the present invention, the computer server (2) communicates to human operators deviations from a predetermined baseline of sensor (3) registers of environmental and safety measures in the edifice (1), and deviations from a predetermined baseline of sensor (3) registers of functioning parameters of devices, mechanisms and structures in the edifice (1), wherein the predetermined baselines are in a range acceptable within environmental and safety regulations.

For the purpose of the present invention the computer server communicates with human operators by sending e-mail, mobile text, alerts, etc. by means of the IoT.

For the purpose of the present invention the term "system" also refers to the term "method".

For the purpose of the present invention the terms "environmental and safety measures" refers to measures comprising any measure of environmental and safety parameters within the edifice (1), as well as, any measure related to parameters affecting human health.

For the purpose of system of the present invention the term "sensor" (3) refers to a dispositive that registers or measures environmental and safety parameters in a device, structure or mechanism, or in any other place in an edifice (1). The term sensor also refers to a dispositive the register operational parameters in a device, structure or mechanism in an edifice (1), e.g., a hospital.

For the purpose of system of the present invention the sensors (3) are integrated to the internet of things (IoT). The sensors of the system of the present invention are provided with unique identifiers (UIDs) and the ability to communicate to other components of the IoT.

For the purpose of system of the present invention the term "controller" refers to a device that actuates in the operation of a device, structure or mechanism in an edifice (1), e.g., a hospital.

For the purpose of system of the present invention the controllers (5) are integrated to the internet of things (IoT). The controllers (5) of the system of the present invention are provided with unique identifiers (UIDs) and the ability to communicate to other components of the IoT.

For the purpose of the system of the present inventions the Internet of thing (IoT) is defined as an arrangement of sensors, controllers, geographical beacons, communicating mobile phone towers, satellites, computing devices, computer servers, communicating devices, mechanical and digital machines, objects, animals, people etc., that are provided with unique identifiers (UIDs) and the ability to transfer data from one component of the arrangement to another component of the arrangement, and over a network or networks.

For the purpose of the system of the present invention the terms "devices, structures and mechanisms" refers to:
  Boilers (6);
  fuel tanks (7), including fuel gas piping and propane gas tanks, and fuel oil tanks (diesel, residual oil, etc.) and others;
  generators (8), including emergency generator and others;
  chillers (9);
  absorbers (10);
  sterilizers (11), including ethylene oxide (ETO) sterilizers, etc.;

fire alarms (12);
hydraulic elevator tanks (13);
elevators (14);
fume hoods (15);
chemical storage rooms and tanks (16);
chimneys and stacks (17);
cogeneration (Cogen) engines (18);
air conditioning and roof top units (19);
Cooling towers (20);
Water lines, and portable and non-portable units (21);
used oil tanks;
any other device, structure and mechanism needed for the operation of an edifice, hospital, etc.;
subcomponents of any of the mentioned above, e.g., valves, filters, batteries, etc.

For illustrative purpose and clarity FIGS. 1 and 2 shows some devices, structures and mechanisms coupled with sensors (3) and controllers (5). However, in the present invention, any device, structure and mechanisms that are necessary to operate an edifice (1) in compliance with human health, and safety and environmental regulations is coupled with at least one sensor (3) and at least one controller (5).

The sensors (3) in the system of the present invention could also be located in a place in the edifice (1) to monitor and measure environmental and safety parameters, e.g., sulfur contents in diesel tanks, oil and gas emissions (NOx, CO, SO2, CO2, etc.), wherein the environmental and safety parameter is the direct, or indirect result of the operation of a device, structure or mechanism in the edifice (1).

For the purpose of the present invention the terms "usage history and usage pattern" refers to the frequency of use, date and time of first service, period length when operating, period length when non-operating, operation specifications, diagnostics tests, and any other measurable aspect of a device, structure and mechanism.

For example, for a battery in a generator, wherein the battery is used to start the generator, "usage history and usage pattern" of the battery refers to date of installation of a battery in the generator, battery age, the specifications of the battery (Amp cranking capacity, Amp cold cranking capacity, type of battery, storage capacity, etc.), sensor (3) and controller (5) registers indicating how many times the battery has been used to start the generator, sensor (3) registers indicating charge percentage capacity of the battery each time the battery is used, sensor (3) registers indicating charging battery time, sensor (3) and controller (5) registers indicating period length when the generator is operating and the battery is recharging, sensor (3) and controller (5) registers indicating period length between occurrences of battery use, sensor (3) registers indicating percentage capacity of battery charge, etc. The computer server (2), based on "usage history and usage pattern" of the battery, predicts estimates of remaining healthy battery life or approaching failure of the battery. In case of approaching failure of the battery, the computer server directs to the battery replacement.

Another example, in the system of the present invention, of "usage history and usage pattern" (3) in a boiler (6) is measurement registers of a sensor in the boiler of NOx, CO2, SO2, greenhouse emissions, efficiencies, etc. The Computer server (2) uses the log of the records of the of the emission registers and the trend and pattern of the emissions indicated by the log to predict an estimate of the upcoming conditions of the boiler, and if the upcoming conditions of the boiler indicate potential failure, the Computer server (2) directs to preventive repairs or replacement of the boiler.

One more example of "usage history and usage pattern" by a sensor (3) in a generator (8) is the measures related to filter efficiency of the control system installed in the generator exhaust. The measures are used by the Computer server (2) to predict an estimate of the filter remaining life, and direct the replacement of the filter before end of the filter life. The replacement of the filter contributes to the life of the emission control system and compliance with safety and environmental regulations.

Although this description presents preferred embodiments of the present invention, additional changes may be made in the form and disposition of the parts without deviating from the ideas and basic principles encompassed by the claims.

The invention claimed is:

1. A system for maintaining environmental health and safety compliance in an edifice, wherein the system comprises:
  a. at least one computer server;
  b. a plurality of sensors in the edifice, wherein the sensors register environmental and safety measures in the edifice, wherein the sensors register functioning parameters of devices, mechanisms and structures in the edifice, and wherein the sensors register usage pattern and usage history of devices, mechanisms and structures in the edifice, wherein the sensors transmit records of the registers to the computer server;
  c. a plurality of controllers in the edifice, wherein the controllers operate the functioning of devices, mechanisms and structures in the edifice, wherein the controllers receive from the computer server instructions to operate the functioning of devices, mechanisms and structures in the edifice;
  wherein the computer server is programmed to generate instructions based on the received sensor records of the registers of environmental measures and functioning parameters of devices, mechanism and structures of the edifice, wherein the computer server sends the generated instructions to the controllers, wherein the controllers actuate on the instructions from the server to operate the devices, structures and mechanisms of the edifice in compliance with environmental and safety regulations, wherein the computer server is programmed to use the register records of usage patterns and usage history to determine predictive estimates of potential failure of devices, mechanisms and structures in the edifice, wherein the computer server use the predictive estimates of potential failure to command replacement or repair of the devices, mechanisms and structures in the edifice, wherein the computer server communicates to human operators deviations from a predetermined baseline of sensor registers of environmental and safety measures in the edifice, and deviations from a predetermined baseline of sensor registers of functioning parameters of devices, mechanisms and structures in the edifice, wherein the predetermined baselines are in a range acceptable within environmental and safety regulations.

2. The system of claim 1, wherein the computer server communicates with the sensors and controllers by means of the Internet of things.

* * * * *